United States Patent [19]

Toda et al.

[11] Patent Number: 5,218,026
[45] Date of Patent: Jun. 8, 1993

[54] FLUORINE-CONTAINING ELASTOMER COMPOSITION

[75] Inventors: Keiichi Toda; Kenichi Hayashi, both of Nobeoka; Hiroshi Saito, Chiba, all of Japan

[73] Assignee: Asahi Kasei Kogyo Kabushiki Kaisha, Osaka, Japan

[21] Appl. No.: 631,284

[22] Filed: Dec. 20, 1990

[30] Foreign Application Priority Data

Dec. 20, 1989 [JP] Japan .................................. 1-328129
Apr. 6, 1990 [JP] Japan .................................. 2-90399
Jun. 12, 1990 [JP] Japan .................................. 2-151723

[51] Int. Cl.⁵ .................. C08F 271/02; C08F 259/08; C08F 291/04
[52] U.S. Cl. ............................ 525/255; 525/244; 525/259; 525/263; 525/276; 525/279; 525/281
[58] Field of Search ............... 525/259, 263, 276, 244, 525/279, 281, 255

[56] References Cited

U.S. PATENT DOCUMENTS 4,806,351 2/1989 Sugimoto et al. .................... 428/522
4,985,520 1/1991 Hayashi et al. ...................... 526/254

FOREIGN PATENT DOCUMENTS 60-72950 4/1985 Japan .
62-30142 2/1987 Japan .
62-30143 2/1987 Japan .
62-79251 4/1987 Japan .

*Primary Examiner*—Jacob Ziegler
*Attorney, Agent, or Firm*—Birch, Stewart, Kolasch & Birch

[57] ABSTRACT

A fluorine-containing elastomer composition comprising a specific fluorine-containing elastomer having iodine bonded thereto and having a multimodel molecular weight distribution, a specific vulcanizing agent, an organic peroxide, and a polyfunctional unsaturated compound. The fluorine-containing elastomer composition has not only excellent processability, mold release properties and burr-removal performance in molding but also capability of providing a vulcanization product which is not only improved with respect to mechanical properties, but also has extremely excellent resistance to chemicals and solvents, particularly methanol, and good metal-adhesion properties.

13 Claims, 1 Drawing Sheet

FLUORINE-CONTAINING ELASTOMER COMPOSITION

BACKGROUND OF THE INVENTION

1. Field of the Invention

The present invention relates to a novel fluorine-containing elastomer composition. More particularly, the present invention is concerned with a vulcanizable, fluorine-containing elastomer composition which can be used to produce a vulcanization product which has not only excellent resistance to heat, solvents and chemicals, but also improved mechanical properties and compression set resistance. The vulcanizable, fluorine-containing elastomer composition of the present invention can advantageously be used for the production of various articles, such as a fuel hose; a sealant material, such as an O-ring, a seal ring, a packing, a gasket and a diaphragm; a solenoid valve; a needle valve; a blade to be used in a copying machine; a heat-fixing roll; and a valve for industrial uses; and can also be used for the production of composite articles in which the elastomer composition is used in combination with another material or other materials. Especially, the fluorine-containing elastomer of the present invention can most advantageously be used as a material for producing articles which are required to have high resistance to chemicals and solvents, such as fuel hoses, valves and O-rings.

2. Discussion of Related Art

In general, fluorine-containing elastomers have excellent resistance to heat, solvent and chemicals and, therefore, have been widely utilized in the manufacture of sealant materials which are subject to being employed under stringent conditions. Examples of such materials are O-rings, oil seals, packings and gaskets; diaphragm materials and the like.

There are various known methods for vulcanizing a fluorine-containing elastomer, such as a method using a polyamine (the polyamine vulcanization method), a method using a polyol (the polyol vulcanization method) and a method using a peroxide (the peroxide vulcanization method). A suitable vulcanization method is selected according to the intended use of a vulcanization product. Recently, according to the development of a new use, however, with vulcanization products produced by a conventional vulcanization method, such as the polyol vulcanization method, the polyamine vulcanization method and the peroxide vulcanization method, it has become impossible to satisfy various requirements of performance in the new use. Particularly, various problems have been encountered when these conventional vulcanization products are used under stringent conditions (for example, when the products are used in the presence of methanol) or when these products are used in the form of a composite article produced in combination with other types of materials, or when the fluorine-containing elastomer is required to have excellent moldability, such as excellent extrusion processability and mold flow properties.

With respect to the polyamine vulcanization method, the vulcanization product obtained is generally poor not only in strength but also in compression set resistance. On the other hand, the polyol vulcanization method, which is most widely used, is disadvantageous in that the vulcanization product obtained is poor in resistance to solvents, chemicals, especially alkalis, and steam. Further, with any of these two methods, it is difficult to vulcanize a low molecular weight polymer (for example, a polymer having a molecular weight of 50,000 or less).

The peroxide vulcanization method is known to be free from the above-mentioned problems and can be used for producing a vulcanization product having relatively good properties. However, the vulcanization product obtained by the peroxide vulcanization method is poor in metal-adhesion properties and therefore, the vulcanization product is unsuitable for applications in which it is used in combination with metals (such as the use as an oil seal or a valve). Further, in the peroxide vulcanization method, when the fluorine-containing elastomer is brought into contact with air during the vulcanization, the progress of vulcanization is extremely hindered, so that portions of the elastomer are likely to be turn off and left as burrs on the surface of the mold. Furthermore, in the peroxide vulcanization method, it is difficult to vulcanize a high molecular weight polymer, so that the vulcanization product obtained is poor in strength and compression set resistance.

Various proposals were made in order to solve the problems accompanying these vulcanization methods. For example, it was proposed to blend two types of polymers, and then vulcanize the resultant blend using a combination of a polyol vulcanizing agent or a polyamine vulcanizing agent with a peroxide vulcanizing agent (see, for example, Japanese Patent Application Laid-Open Specification Nos. 60-72950, 62-30142 and 62-30143). The polymer blend used in this proposal is a blend of a terpolymer comprising vinylidene fluoride, hexafluoropropylene and tetrafluoroethylene and a copolymer comprising tetrafluoroethylene and propylene. However, in this proposal, the rate of the vulcanization reaction is low since the reaction does not involve the formation of such vulcanization sites as formed by deiodination radical reaction or debromination radical reaction On the other hand, a method has been proposed in which a combination of a polyol vulcanizing agent with a peroxide vulcanizing agent is used for vulcanizing a blend of a bromine-containing terpolymer comprising vinylidene fluoride, hexafluoropropylene and tetrafluoroethylene and a copolymer comprising tetrafluoroethylene and propylene (see, for example, Japanese Patent Application Laid-Open Specification No. 62-79251). However, in this method, the rate of the vulcanization reaction is low since the bromine atoms, which would form vulcanization sites, are not easily liberated. Further, the vulcanization product obtained by this method is likely to have unsatisfactory properties.

Further, in order to improve adhesion between the fluororubber and NBR (acrylonitrile-butadiene rubber), there has been proposed a laminate material comprising a fluororubber and NBR, wherein the fluororubber has, incorporated therein, a combination of a polyol vulcanizing agent with a peroxide vulcanizing agent (see, for example, Japanese Patent Application Laid-Open Specification No. 61-244545). However, in this laminate material, a conventional fluororubber is used and, therefore, should not be improved in processability, such as roll processability.

SUMMARY OF THE INVENTION

In order to overcome the above-mentioned problems accompanying the prior art, the present inventors have conducted extensive and intensive studies with a view toward developing a fluorine-containing elastomer composition which has both excellent processability and capability of providing a vulcanization product exhibiting excellent properties. As a result, it has unexpectedly been found that a fluorine-containing elastomer composition comprising a specific fluorine-containing elastomer having iodine bonded thereto and having a multimodal molecular weight distribution, a specific vulcanizing agent, an organic peroxide, and a polyfunctional unsaturated compound, has not only excellent processability (such as extrusion processability), mold release properties and burr-removal performance in molding but also capability of being well vulcanized with respect to all of the polymer moieties throughout the entire range of molecular weight distribution thereof and capability of providing a vulcanization product which is not only improved with respect to mechanical properties, such as strength and compression set resistance, but also has extremely excellent resistance to chemicals and solvents, particularly methanol, and good metal-adhesion properties. The present invention has been completed, based on this novel finding.

Accordingly, it is an object of the present invention to provide a novel fluorine-containing elastomer composition having the above-mentioned excellent properties.

The foregoing and other objects, features and advantages of the present invention will be apparent from the following detailed description and appended claims taken in connection with the accompanying drawing.

DETAILED DESCRIPTION OF THE INVENTION

Figure 1:
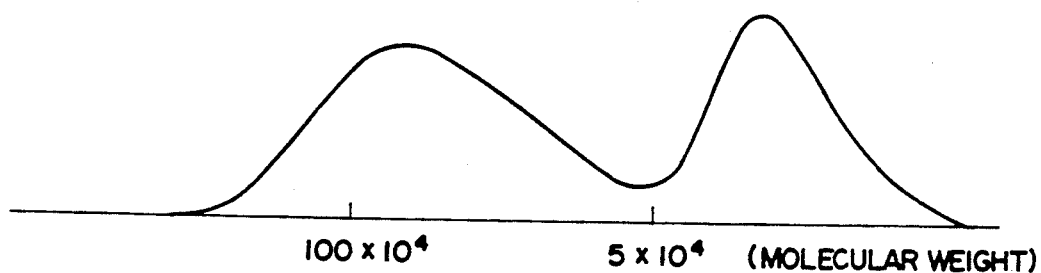
FIGS. 1 to 3 are, respectively, diagrams showing the molecular weight distributions of the elastomers obtained in Reference Example 1, Reference Example 4, and Reference Example 16.

According to the present invention, there is provided a fluorine-containing elastomer composition comprising:

(A) a fluorine-containing elastomer comprising (a) vinylidene fluoride units, (b) hexafluoropropylene units and 35 to 0 % by weight, based on the total weight of units (a), (b) and (c), of (c) tetrafluoroethylene units, the weight ratio of (a) to (b) is in the range of 40:60 to 80:20, wherein:
   the limiting viscosity number (ml/g) of the elastomer is in the range of from 40 to 200,
   the ratio of the weight average molecular weight to the number average molecular weight of the elastomer is in the range of from 3 to 25,
   the elastomer has a multimodal molecular weight distribution such that in the molecular weight distribution curve obtained by gel permeation chromatography, the elastomer exhibits a plurality of peaks comprised of one peak on the low molecular weight side, which peak is defined as a peak appearing in the lowest molecular weight region among the plurality of peaks and at least one peak on the high molecular weight side, which peak is defined as a peak appearing on the higher side of molecular weight relative to the lowest molecular weight region, and
   the elastomer has iodine bonded thereto;

(B) at least one vulcanizing agent selected from the group consisting of a polyol vulcanizing agent, a polyamine vulcanizing agent and a mixture thereof,
   the polyol vulcanizing agent comprising a polyhydroxy aromatic compound, at least one salt selected from the group consisting of an ammonium salt, a phosphonium salt and an iminium salt and at least one metal compound selected from the group consisting of a bivalent metal oxide and a bivalent metal hydroxide, and
   the polyamine vulcanizing agent comprising a polyamine compound and a bivalent metal oxide;

(C) an organic peroxide; and (D) a polyfunctional unsaturated compound.

Examples of fluorine-containing elastomer component (A) used in the composition of the present invention include a binary copolymer comprising VdF units (a) and HFP units (b) and a terpolymer comprising VdF units (a), HFP units (b) and TFE units (c). It is requisite that the weight ratio of VdF units (a) to HFP units (b) be in the range of 40:60 to 80:20. When the content of VdF units (a) is lower than the above-mentioned range, the polymerization rate becomes extremely lowered and it is difficult to obtain an elastomer having a high molecular weight. On the other hand, when the content of VdF units (a) is larger than the above-mentioned range, the fluorine-containing elastomer obtained is likely to be resinous and low in elasticity.

When the fluorine-containing elastomer is a terpolymer comprising VdF units (a), HFP units (b) and TFE units (c), it is requisite that the content of TFE units (c) be not greater than 35 % by weight, based on the total weight of units (a), (b) and (c). If the content of TFE units (c) exceeds 35 % by weight, the fluorine-containing elastomer is likely to be low in elasticity. The content of TFE units (c) is preferably in the range of from 5 to 25 % by weight.

With respect to the binary copolymer not containing TFE units (c), the weight ratio of VdF units (a) to HFP units (b) is preferably in the range of from 55:45 to 75:25. With respect to the terpolymer containing TFE units (c), the weight ratio of VdF units (a) to HFP units (b) is preferably in the range of 45:55 to 70:30.

When the fluorine-containing elastomer composition is required to have a low fluorine content (about 66 % by weight or less) so that the composition exhibits particularly improved processability, the use of a binary copolymer is preferred. Whereas, when the fluorine-containing elastomer composition is to be used for producing articles having excellent resistance to oil and chemicals, such as parts of automobiles or chemical apparatus, which are required to have a high fluorine content (about 67 % by weight or more), the use of a terpolymer is preferred.

The fluorine-containing elastomer used in the composition of the present invention is required to have a multimodal molecular weight distribution such that in the molecular weight distribution curve obtained by gel permeation chromatography, the elastomer exhibits a plurality of peaks comprised of one peak on the low molecular weight side, which peak is defined as a peak appearing in the lowest molecular weight region among the plurality of peaks and at least one peak on the high molecular weight side, which peak is defined as a peak appearing on the higher side of molecular weight relative to the lowest molecular weight region. By virtue of the multimodal molecular weight distribution, a fluorine-containing elastomer composition having both excellent mechanical properties and processability can be realized. The high molecular weight fractions contribute to the mechanical properties of the molded article, while the low molecular weight fractions contribute to the processability of the composition. When the fluorine-containing elastomer has a monomodal molecular weight distribution, it is very difficult to obtain a fluorine-containing elastomer composition having satisfactory mechanical properties and processability simultaneously.

The fluorine-containing elastomer used in the present invention has a limiting viscosity number $[\eta]$, which is an index of a molecular weight, of 40 to 200 ml/g. When the limiting viscosity number $[\eta]$ of the elastomer is less than 40 ml/g (which means that the elastomer contains low molecular weight polymer components in too large a proportion), the composition is likely to adhere to rolls, so that the mold release characteristics are likely to be poor. Further, the mechanical strength and compression set resistance of a molded article obtained from the composition are also likely to be poor. On the other hand, when the limiting viscosity number $[\eta]$ exceeds 200 ml/g, the processability properties, such as sheet-forming properties of the composition, are likely to be poor, so that it is difficult to produce a sheet having a large thickness by means of rolls.

In the fluorine-containing elastomer used in the present invention, the ratio of the weight average molecular weight ($\overline{Mw}$) to the number average molecular weight ($\overline{Mn}$), i.e., $\overline{Mw}/\overline{Mn}$ ratio, which is an index of the molecular weight distribution, is in the range of from 3 to 25. When the $\overline{Mw}/\overline{Mn}$ ratio exceeds 25, the molecular weight distribution of the elastomer is too broad, that is, the elastomer contains both very low molecular weight components and very high molecular weight components in relatively large proportions. When the elastomer contains very low molecular weight components in a relatively large proportion, the mechanical properties of the molded rubber article obtained from the composition are likely to be poor, although the processability of the composition is good. On the other hand, when the elastomer contains very high molecular weight components in a relatively large proportion, there are tendencies which are inverse to those in the case where the elastomer contains low molecular weight components in a relatively large proportion. As a result, such a composition cannot simultaneously have both excellent processability and excellent capability of producing a vulcanized, shaped rubber article having excellent mechanical properties. On the other hand, when the $\overline{Mw}/\overline{Mn}$ ratio is less than 3, the effect of the multimodal molecular weight distribution cannot be markedly exhibited.

In the following two more preferred embodiments of the present invention, the fluorine-containing elastomer composition of the present invention has more excellent extrusion processability and roll processability (i.e., no adherence to rolls) and capability of providing a vulcanization product having desired properties, such as excellent resistance to solvent extraction.

In one of these preferred embodiments, the fluorine-containing elastomer of the composition of the present invention, preferably has the following characteristics The limiting viscosity number (ml/g) of the elastomer is in the range of from 100 to 170, the ratio of the content of fractions having a molecular weight of not greater than 50,000 to the limiting viscosity number (ml/g) of the elastomer is in the range of from 0.25 to 0.60, the ratio of the weight average molecular weight to the number average molecular weight of the elastomer is in the range of from 10 to 25, the content of fractions having a molecular weight of not greater than 10,000 in the elastomer is less than 15 % by weight, and with respect to fractions corresponding to the at least one peak on the high molecular weight side in the molecular weight distribution curve, the ratio of the weight average molecular weight to the number average molecular weight is in the range of from 1.2 to 3.0.

In this preferred embodiment, the limiting viscosity number $[\eta]$ of the elastomer is preferably in the range of from 100 to 170, more preferably in the range of from 100 to 140. A limiting viscosity number of 100 ml/g or more is desirable from the viewpoint of attaining low adherence of the composition to rolls at the time of roll kneading, and a limiting viscosity number of 170 ml/g or less is desirable from the viewpoint of ensuring a proper flowability of the composition for facilitating extrusion molding.

In this preferred embodiment, the ratio of the content of fractions having a molecular weight of not greater than 50,000 (hereinafter referred to as "$M_5$") to the limiting viscosity number $[\eta]$ (ml/g) of the elastomer (i.e., $M_5/[\eta]$ ratio) is preferably in the range of from 0.25 to 0.60, more preferably in the range of from 0.30 to 0.50. There are tendencies such that an increase in $M_5$ leads to an improvement in extrusion speed and in the texture of an extrudate, and an increase in $[\eta]$ leads to a lowering of extrusion speed and the texture of an extrudate. From the viewpoint of good extrusion processability, the $M_5/[\eta]$ ratio is desired to be in the above-mentioned range. Illustratively stated, an $M_5/[\eta]$ ratio of 0.25 or more is desirable from the viewpoint of good extrusion speed and a good texture of an extrudate, and an $M_5/[\eta]$ ratio of 0.60 or less is desirable from the viewpoint of good green strength to prevent deformation of an extrudate upon extrusion and the viewpoint of attaining high mechanical strength of a vulcanization product.

In this preferred embodiment, the ratio of the weight average molecular weight ($\overline{Mw}$) to the number average molecular weight ($\overline{Mn}$) of the elastomer (i.e., $\overline{Mw}/\overline{Mn}$ ratio) is preferably in the range of from 10 to 25, more preferably in the range of from 14 to 20. An $\overline{Mw}/\overline{Mn}$ ratio of 10 or more is desirable from the viewpoint of suitable molecular weight distribution to attain good extrusion processability, such as extrusion speed and extrudate texture. When this ratio exceeds 25 (which means that the elastomer contains super-high molecular weight components and super-low molecular weight components in large proportions), die swell (increase in dimension of the extrudate) at the time of extrusion is disadvantageously increased.

In this embodiment, the content of fractions having a molecular weight of not greater than 10,000 (hereinafter referred to as "$M_1$") in the elastomer is preferably less than 15 % by weight, more preferably 12 % by weight. The $M_1$ content has a relationship with the extraction of a vulcanization product immersed in a solvent, such as methanol. That is, the larger the $M_1$ content, the larger the extraction, by a solvent, of a vulcanization product. Thus, an $M_1$ content of less than 15 % by weight is desirable from the viewpoint of maintaining a low extraction by a solvent.

In this embodiment, the content of polymer fractions having a molecular weight of 2,000,000 or more (hereinafter referred to as "$M_{200}$") in the elastomer is preferably in the range of from 4 to 10% by weight, more preferably in the range of from 6 to 8% by weight. The $M_{200}$ content has a relationship with the tensile strength of a vulcanization product and the die swell of the composition upon extrusion. That is, an $M_{200}$ content of 4% by weight or more is desirable from the viewpoint of good tensile strength of a vulcanization product, and an $M_{200}$ content of not greater than 10% by weight is desirable from the viewpoint of advantageously small die swell of the composition at the time of extrusion.

In this embodiment, with respect to polymer fractions corresponding to the at least one peak on the high molecular weight side in the molecular weight distribution curve, which fractions have a molecular weight of 50,000 or more, the ratio of the weight average molecular weight ($\overline{Mw}$) to the number average molecular weight ($\overline{Mn}$) (i.e., $\overline{Mw}/\overline{Mn}$ ratio) is preferably in the range of from 1.2 to 3.0, more preferably in the range of from 1.2 to 2.5. When this ratio is 3.0 or less, a good balance between the content of the high molecular weight polymer fractions and the content of the low molecular weight polymer fractions is attained in respect of extrusion processability of the composition and resistance to solvent extraction of a vulcanization product. Thus, an $\overline{Mw}/\overline{M}$ ratio of 3.0 or less is desirable from the viewpoint of excellence in both extrusion processability and resistance to solvent extraction. On the other hand, it is difficult to produce a fluorine-containing elastomer having an $\overline{Mw}/\overline{M}$ ratio of less than 1.2 by customary polymerization technique.

The other more preferred embodiment of the present invention is described as follows. In this preferred embodiment, the fluorine-containing elastomer preferably has the following characteristics:

the limiting viscosity number (ml/g) of the elastomer is in the range of from 60 to 130, the ratio of the content of fractions having a molecular weight of not greater than 50,000 to the limiting viscosity number (ml/g) of the elastomer is in the range of from 0.15 to 0.60, and the ratio of the weight average molecular weight to the number average molecular weight of the elastomer is in the range of from 4 to less than 8.

In this preferred embodiment, the limiting viscosity number [$\eta$], which is an index of molecular weight, of the elastomer is preferably in the range of from 60 to 130 ml/g, more preferably in the range of from 70 to 120 ml/g. A limiting viscosity number of 60 ml/g or more is desirable from the viewpoint of low adherence of the composition to rolls at the time of roll kneading, and a limiting viscosity number of 130 ml/g or less is desirable from the viewpoint of a proper flowability of the composition for facilitating extrusion.

In this embodiment, the ratio of the content of the polymer fractions having a molecular weight of not greater than 50,000 ($M_5$) to the limiting viscosity number [$\eta$] of the elastomer (i.e., $M_5/[\eta]$ ratio) is in the range of from 0.15 to 0.60, more preferably in the range of from 0.20 to 0.50. The extrusion processability of an elastomer depends on both $M_5$ and [$\eta$]. There are tendencies such that an increase in $M_5$ leads to an improvement in extrusion speed and in the texture of an extrudate, and an increase in [$\eta$] leads to a lowering of the extrusion speed and the texture of an extrudate. From the viewpoint of good extrusion processability, the $M_5/[\eta]$ ratio is desired to be in the above-mentioned range. Illustratively stated, an $M_5/[\eta]$ ratio of 0.15 or more is desirable from the viewpoint of the desired extrusion speed and a good texture of an extrudate, and an $M_5/[\eta]$ ratio of 0.60 or less is desirable from the viewpoint of good green strength to prevent deformation of an extrudate upon extrusion and the viewpoint of attaining high mechanical strength of a vulcanization product.

In this preferred embodiment, the ratio of the weight average molecular weight ($\overline{Mw}$) to the number average molecular weight ($\overline{Mn}$) of the elastomer (i.e., $\overline{Mw}/\overline{Mn}$ ratio) is preferably in the range of from 4 to less than 8, more preferably in the range of from 5 to 7. An $\overline{Mw}/\overline{M}$ ratio of 4 or more is desirable from the viewpoint of a suitable molecular weight distribution and a good balance of the content of the high molecular weight polymer fractions and the content of the low molecular weight polymer fractions, and thus an $\overline{Mw}/\overline{Mn}$ ratio in this range is effective for attaining not only good extrusion processability, such as excellent extrusion speed and extrudate texture, but also high mechanical strength and advantageously low adherence to rolls. In addition, an $\overline{Mw}/\overline{M}$ ratio of less than 8 (which means that the content of the super-low molecular weight polymer fractions in the elastomer is not too large), is desirable from the viewpoint of good resistance, of a vulcanization product, to solvent extraction.

The above-mentioned two preferred types of fluorine-containing elastomers, that is, the elastomer having an $\overline{Mw}/\overline{M}$ ratio in the range of from 4 to 8 and the elastomer having an $\overline{Mw}/\overline{M}$ ratio in the range of from 10 to 25, have different characteristics due to the difference in molecular weight distribution. Selection can be made from these elastomers according to the desired characteristics. For example, in the elastomer having an $\overline{Mw}/\overline{M}$ ratio in the range of from 4 to 8, the content of the extremely low molecular weight polymer fractions is small and therefore, this type of elastomer can readily be kneaded without difficulty even when the temperature of the surfaces of the rolls is relatively high, despite the fact that the high temperature usually renders kneading operation difficult. On the other hand, the elastomer having an $\overline{Mw}/\overline{M}$ ratio of 10 to 25 contains high molecular weight polymer fractions and low molecular weight polymer fractions in large proportions, and therefore, this type of elastomer has excellent extrusion processability without sacrificing mechanical properties. The type of elastomer may be selected depending on the type of the processing machine to be employed and the operating conditions. For example, the type of elastomer may be selected depending on the sizes and designs of the screw and the die of a processing machine, such as an extruder.

It is requisite that fluorine-containing elastomer (A) have iodine bonded to the molecular chain thereof. This iodine can readily be liberated upon vulcanization by peroxide, to thereby form radicals in the polymer chain, and these radicals function as crosslinking sites. By virtue of the use of iodine, which can easily be liberated, the composition of the present invention can be vulcanized to a high vulcanization degree in a short period of time to thereby produce a vulcanization product having excellent properties, as compared to the composition containing a conventional fluorine-containing polymer having bromine bonded thereto.

As a method for introducing iodine into the polymer chain, various known methods can be used, in which an iodine-containing vinyl compound is copolymerized with the polymer. However, more effective and advantageous is a method in which an iodine compound is used as a chain transfer agent (see Japanese Patent Application Laid-Open Specification Nos. 53-125491 and 60-221409). By this method, iodine can easily be introduced into the terminals of the molecular chain. Preferred examples of chain transfer agents include monoiodomethane, 1-iodomethane, 1-iodo-n-propane, isopropyl iodine, diiodomethane, 1,2-diiodomethane, 1,3-diiodo-n-propane and perfluoroiodides thereof obtained by substituting all of the hydrogen atoms with fluorine atoms.

The amount of the iodine present in the elastomer is preferably from 0.01 to 5% by weight, more preferably from 0.1 to 2.5% by weight, based on the total weight of units (a), (b) and (c) and the iodine. An amount of iodine of 0.01% by weight or more is desirable because a suitably small distance between the adjacent crosslinking sites is obtained, so that the satisfactory crosslinking degree can be attained to thereby obtain a vulcanization product having satisfactory mechanical properties. In addition, an amount of iodine of not greater than 5% by weight is desirable from the viewpoint of the suitable mutual remoteness of the adjacent crosslinking sites for obtaining a vulcanization product having satisfactory elasticity.

The fluorine-containing elastomer used in the present invention having a multimodal molecular weight distribution can be produced, for example, by blending a component polymer having a high molecular weight with a component polymer having a low molecular weight, each being separately produced. However, it is preferred to produce the fluorine-containing elastomer by a suspension polymerization method in which a chain transfer agent is added during the polymerization, since an elastomer having a multimodal molecular weight distribution with relatively sharp peaks can be obtained. The polymerization reaction is started to produce a polymer having a peak on the high molecular weight side, followed by adding a chain transfer agent and optionally a polymerization catalyst to thereby produce a polymer having a peak on the low molecular weight side. It is preferred to employ the above-mentioned iodine compound as the chain transfer agent. For example, the suspension polymerization can be conducted as follows. In an aqueous medium is dispersed an inert organic solvent having a predetermined monomer mixture (starting monomer mixture) dissolved therein. A suspension stabilizer and an oil-soluble catalyst, and optionally the above-mentioned chain transfer agent are then added, followed by stirring mechanically while maintaining the temperature at 50° to 60° C. Subsequently, added thereto is a fresh one (additional monomer mixture) of the above-mentioned monomer mixture to maintain the polymerization pressure at a level within the range of preferably from 5 to 17 kg/cm$^2$.G, and the reaction is continued. The monomer unit composition in the resultant fluorine-containing elastomer depends on the relation between the proportions of the starting monomers and those of the additional monomers. The proportions of the starting monomers and those of the additional monomers can be determined by gas chromatography, and the proportions of the monomer units in the fluorine-containing elastomer can be determined by dissolving the elastomer in acetone and subjecting the resultant solution to $^{19}$F-NMR. The regulation of the molecular weight of the fluorine-containing elastomer and the introduction of iodine are conducted by adding the above-mentioned chain transfer agent in the course of the polymerization reaction.

Examples of inert organic solvents to be used in the suspension polymerization include an organic solvent which does not have a carbon-hydrogen linkage, such a linkage being disadvantageously likely to cause radical chain transfer. Of such solvents, 1,1,2-trichloro-1,2,2-trifluoroethane is preferred from the viewpoint of performance and cost. As a suspension stabilizer, methyl cellulose is preferred. As an oil-soluble catalyst, dialkyl peroxydicarbonates, such as diisopropyl peroxydicarbonate, are preferred because of their having a high decomposition temperature.

The composition of the present invention comprises, as component (B), at least one vulcanizing agent selected from the group consisting of a polyol vulcanizing agent, a polyamine vulcanizing agent and a mixture thereof. The polyol vulcanizing agent comprises a polyhydroxy aromatic compound as a crosslinking agent, at least one salt selected from the group consisting of an ammonium salt, a phosphonium salt and an iminium salt as a vulcanization accelerator and at least one metal compound selected from the group consisting of a bivalent metal oxide and a bivalent metal hydroxide as an acid acceptor.

Preferred examples of the above-mentioned polyhydroxy aromatic compound include hydroquinone, 2,2-bis(4-hydroxyphenyl)propane-(bisphenol A), 2,2-bis(4-hydroxyphenyl)perfluoropropane(bisphenol AF), 4,4,-dihydroxydiphenylmethane, 2,2-bis(4-hydroxyphenyl)-butane and the like. The amount of the polyhydroxy aromatic compound is in the range of 0.1 to 10 parts by weight, preferably 0.6 to 5 parts by weight per 100 parts by weight of the elastomer. These polyhydroxy aromatic compounds may be used individually or in combination.

Representative examples of ammonium salts, phosphonium salts and iminium salts include tetramethylammonium chloride, tetraethylammonium chloride, tetrapropylammonium chloride, tetrabutylammonium chloride, tetrabutylammonium bromide, bis(benzyldiphenylphosphine)iminium chloride, tetrabutylphosphonium chloride, benzyltriphenyl phosphonium chloride, benzyltrioctylphosphonium chloride and the like. The amount of the salt is generally 0.05 to 2 parts by weight, preferably 0.1 to 1 part by weight per 100 parts by weight of the elastomer. The above salts may be used individually or in combination.

Examples of bivalent metal oxides and bivalent metal hydroxides include oxides and hydroxides of magnesium, calcium, zinc, lead and the like. The amount is generally in the range of 1 to 30 parts by weight, preferably 2 to 20 parts by weight per 100 parts by weight of the elastomer. These compounds may be used individually or in combination.

If desired, various vulcanization promoters can be added in order to enhance the effect of the vulcanization accelerator. Representative examples of vulcanization promoters include sulfone compounds, such as dimethylsulfone, dichlorodiphenylsulfone and the like.

On the other hand, the polyamine vulcanizing agent comprises a polyamine compound as a crosslinking agent and a bivalent metal oxide as an acid acceptor. Preferred examples of polyamine compounds include hexamethylenediamine carbamate, N,N'-dicinnamylidene-1,6-hexamethylenediamine and 4,4'-bis(aminocyclohexyl) methane carbamate. The amount of the polyamine compound is generally 0.1 to 10 parts by weight, preferably 0.5 to 5 parts by weight per 100 parts by weight of the elastomer. The polyamine compounds may be used individually or in combination.

Examples of bivalent metal oxides include magnesium oxide, calcium oxide, zinc oxide, lead oxide and the like. The amount of the bivalent metal oxide is generally in the range of 1 to 30 parts by weight, preferably 5 to 20 parts by weight per 100 parts by weight of the elastomer. The bivalent metal oxides may be used individually or in combination.

When a mixture of the polyol vulcanizing agent and the polyamine vulcanizing agent is used as a vulcanizing agent, it is preferred that the polyol vulcanizing agent comprise 0.1 to 5 parts by weight, per 100 parts by weight of the elastomer, of the polyhydroxy aromatic compound, 0.05 to 2 parts by weight, per 100 parts by weight of the elastomer, of the at least one salt and 1 to 20 parts by weight, per 100 parts by weight of the elastomer, of the at least one metal compound, and the polyamine vulcanizing agent comprise 0.1 to 5 parts by weight, per 100 parts by weight of the elastomer, of the polyamine compound and 1 to 20 parts by weight, per 100 parts by weight of the elastomer, of the bivalent metal oxide.

With respect to the organic peroxide used as component (C) in the composition of the present invention, an organic peroxide which easily produces a peroxy radical by heating is preferred. Preferred examples of organic peroxides include dialkyl peroxides, such as 2,5-dimethyl-2,5-di(t-butylperoxy) hexyne-3, 2,5-dimethyl-2,5-di(t-butylperoxy) hexane.

It is considered that the above organic peroxides generate radicals by heating at the vulcanization, and the produced radicals react with iodine in the elastomer to produce radicals in the elastomer, and two of the thus produced radicals in the elastomer are linked with each other to cause crosslinking.

The organic peroxides may be used individually or in combination. The amount of the organic peroxide is suitably selected, depending on the amount of active oxygen and the decomposition temperature, but is generally in the range of 0.05 to 10 parts by weight, preferably 0.05 to 5 parts by weight per 100 parts by weight of the elastomer. When the amount is less than 0.05 parts by weight, the amount of radicals to be produced is not enough to effectively progress the crosslinking reaction. An amount of the oragnic peroxide exceeding 10 parts by weight is disadvantageous from the viewpoint of cost, because additional improvement in the effect is not attained in proportion to the increased amount. In addition, decomposition gas of the excess peroxide is likely to cause foaming, thereby decreasing the mechanical properties of the resultant elastomer.

The polyfunctional unsaturated compound used as component (D) in the composition of the present invention, is effective to effectively progress the cross-linking reaction.

Examples of polyfunctional unsaturated compounds include triallyl cyanurate, triallyl isocyanurate, tris-(diallylamine)-s-triazine and the like. Of these, triallyl isocyanurate is more preferred. These polyfunctional unsaturated compounds may be used individually or in combination. The amount of the polyfunctional unsaturated compound is generally in the range of 0.01 to 10 parts by weight, preferably 0.1 to 5 parts by weight per 100 parts by weight of the elastomer.

Further, in order to improve resistance to solvent cracking, that is, in order to avoid the occurrence of cracks caused when an elastomer is immersed in a solvent, the following formulation is preferred: 100 parts by weight of a fluorine-containing elastomer, 0.05 to 0.6 part by weight, preferably 0.05 to 0.4 part by weight of an organic peroxide, 0.01 to 1.5 parts by weight, preferably 0.01 to 1.0 part by weight of a polyfunctional unsaturated compound, 0.5 to 3 parts by weight, preferably 1.0 to 2.5 parts by weight of a polyhydroxy aromatic compound, 0.1 to 1.0 part by weight, preferably 0.2 to 0.75 part by weight of a salt selected from the group consisting of an ammonium salt, a phosphonium salt and an iminium salt.

To the composition of the present invention, a reinforcing agent such as carbon black, silica and clay, talc, and a processing aid, such as waxes and the like can be added, if desired.

The fluorine-containing elastomer composition of the present invention can be prepared by mixing and kneading the previously described components (A), (B), (C) and (D), and optionally, additives, by means of rolls or a Banburry mixer.

The thus obtained fluorine-containing elastomer composition is further well kneaded, and cut into long strips and subjected to an extruder to, thereby obtain a shaped elastomer in the form of a tube or an irregular-shaped rod. The composition can also be molded by a customary method such as, injection molding, press molding and calendering. If desired, the composition may further be subjected to a secondary vulcanization to obtain a desired vulcanization product.

The fluorine-containing elastomer used in the composition of the present invention has iodine bonded thereto. The iodine is considered to be mostly bonded to the molecular terminals of the elastomer, judging from the polymerization mechanism. The terminal iodine is detached by the action of an organic peroxide during the vulcanization, and the elastomers are linked with each other at the terminals thereof through a polyfunctional unsaturated compound, simultaneously with the crosslinking reaction between elastomer chains effected by a polyol or polyamine vulcanizing agent. Therefore, the obtained vulcanized elastomer is well vulcanized with respect to all of the polymer moieties throughout the entire range of molecular weight distribution thereof, and has excellent properties exhibiting a good balance of strength and elongation. Moreover, the vulcanized elastomer exhibits improved compression set because of the increased crosslinking density. By the present invention, extremely low molecular weight elastomer fractions which cannot be vulcanized by the conventional polyol vulcanization or polyamine vulcanization can also be vulcanized, thereby greatly improving the resistance to solvents, particularly resistance to methanol extraction, of the vulcanized elastomer.

In the conventional polyol vulcanization and polyamine vulcanization, crosslinking occurs between carbon and oxygen, and between carbon and nitrogen, respectively, so that the obtained vulcanized elastomer is poor in resistance to chemicals. By contrast, the vulcanized elastomer produced from the composition of the present invention is reinforced with a network chain of carbon-carbon bonds formed by peroxide vulcanization, so that the chemical resistance of the vulcanized elastomer is excellent.

Further, in the case of the conventional peroxide vulcanization, the vulcanization reaction is retarded when the elastomer to be vulcanized is contacted with the air. Therefore, the burr which has been in contact with the air and hence not well vulcanized, cannot be easily removed from the metal mold and is kept adhering to the metal mold. By contrast, in the case of the composition of the present invention, the burr having been in contact with the air, can be well vulcanized by a polyol or polyamine vulcanizing agent, so that the burr can be easily removed and therefore, the metal mold is free from the sticking of burr.

Recently, there are various types of parts and members produced by injection molding or extrusion molding, which are required to have resistance to heat, solvents and fuel oil, and which are difficult to produce because of their having complicated configurations. Representative examples of such parts and members are a fuel hose and engine components of an automobile. Further, there is a strong demand in the art for parts which are highly resistant to extraction when immersed in a fuel oil. The fluorine-containing elastomer composition of the present invention in which the elastomer has a molecular weight distribution exhibiting a plurality of peaks comprised of one peak on the low molecular weight side, and at least one peak on the high molecular weight side, and which has iodine bonded to at least the low molecular weight fraction, meets the above requirements and demand, and can advantageously be used for these applications.

With respect to the fluorine-containing elastomer composition of the present invention, the measuring conditions for the limiting viscosity number of the elastomer, the molecular weight distribution of the elastomer, the amount of iodine present in the elastomer and the mechanical properties of a vulcanization product, are shown as follows.

(1) Limiting viscosity number

A 0.1 g/100 ml solution of the elastomer in methyl ethyl ketone is subjected to viscosity measurement using a capillary viscometer at 35° C.

(2) Molecular weight distribution

Gel permeation chromatography: LC-3A (manufactured and sold by Shimadzu Corp., Japan)

Columns: KF-80M (two) +KF-800P (precolumn)- (manufactured and sold by Showa Denko K.K., Japan)

Detector ERC-7510S (manufactured and sold by ELMA Optical Works, Ltd., Japan)

Integrator: 7000A (manufactured and sold by System Instruments Co., Ltd., Japan)

Developer: tetrahydrofuran

Concentration: 0.1% by weight

Temperature: 35° C.

Standard polymer for molecular weight calibration: various monodisperse polystyrenes (manufactured and sold by Toyo Soda Mfg Co., Ltd., Japan) ($\overline{Mw}/\overline{Mn}=1.2$ (max))

(Note): $\overline{Mw}/\overline{Mn}$ ratio of hi9h molecular weight polymer fractions is calculated from the results of the above measurements, by a method in which peaks of the molecular weight distribution curve on a GPC chromatogram are separated so that at least one peak on the high molecular weight side is taken out, and its $\overline{Mw}/\overline{M}$ is calculated. Separation of peaks is conducted by calculation using nonlinear least squares method, considering that each peak shows a Gaussian distribution.

(3) The amount of iodine present in an elastomer

An elastomer is dissolved in acetone and the amount of iodine present therein is measured by X-ray fluorescence method.

(4) Mechanical properties of vulcanized elastomer

A fluorine-containing elastomer composition prepared by roll kneading is put in a metal mold and subjected to press vulcanization. Then, the resultant is taken out from the mold and subjected to oven vulcanization, thereby obtaining a vulcanized sheet having a 2 mm thickness. No. 3 dumbbell specimens are blanked out from the 2 mm-thick sheet of vulcanized elastomer and subjected to measurement using a tensile machine (manufactured by Toyo Seiki Co., Ltd., Japan) at a pulling rate of 50 cm/min according to the method of JIS-K6301.

(5) Compression set

With respect to the measurement of the compression set, substantially in accordance with the method of JIS-K6301, vulcanized P-24 type O-rings are compressed so that the thickness thereof decreases by 25% and kept at 200° C. for 24 hours and then allowed to cool at room temperature for 30 minutes, followed by measurement using a thickness meter (manufactured by Kyoto Kobunshi Keiki Co., Ltd., Japan).

(6) Metal-adhesion properties

To one surface of a SUS 304 steel sheet (50×15×1 mm), which surface has been abraded with #240 abrasive paper, is coated by brushing a vulcanized adhesive (Monicas CF-5M manufactured and sold by Yokohama Kobunshi Kenkyujo, Japan). The adhesive is airdried at room temperature for 30 minutes and then baked at 120° C. for 10 minutes. Thereafter, the unvulcanized fluorine-containing elastomer composition is contacted with the surface of the SUS 304 steel sheet on which surface the adhesive is coated and baked, and press vulcanization is then conducted under predetermined conditions, followed by heat treatment under predetermined conditions for oven vulcanization, thereby obtaining a test sheet. An attempt is made to peel off the elastomer of the test sheet at a peel angle of 90° using a pair of pincers. When the elastomer is broken, an attempt is again made to peel off the elastomer at another position in the test sheet in substantially the same manner as described above. The metal-adhesion properties are evaluated by the following criteria:

: the elastomer has been strongly adhered to the surface of the steel sheet and part of the vulcanized elastomer is torn-off and left over the entire surface of the steel sheet when an attempt is made to peel off the vulcanized elastomer.

Δ: part of the vulcanized elastomer is torn-off and left over almost the entire surface of the steel sheet when an attempt is made to peel off the vulcanized elastomer.

x: the vulcanized elastomer is completely peeled off.

(7) Burr-removal performance in molding

Burr-removal performance is examined with respect to burr formed by subjecting an elastomer to press vulcanization using a metal mold to be used for producing 16 pieces of P-24 O-rings. Burr-removal performance is evaluated by the following criteria.

: burr can be easily removed from the mold (good).

Δ: burr can be removed from x: burr is difficult to remove from the mold (poor).

(8) Resistance to methanol extraction

A 2 mm-thick sheet is cut into a piece of about 5 mm×5 mm size and this piece is immersed in methanol for 48 hours at 65° C. or 288 hours at 50° C. to thereby obtain an extract. The methanol is evaporated from the extract to collect the residue, followed by measurement of the amount of the residue (hereinafter referred to as "amount of methanol extract").

(9) Roll processability

Roll adhesion is evaluated with respect to a raw rubber or a vulcanizing agent-containing raw rubber by means of a 6-inch roll mill. How the rubber is easily removed from the rolls is evaluated.

(10) Hardness

Hardness is measured by spring type hardness tester A substantially in accordance with JIS-K6301.

(11) Extrusion processability

Extrusion test is conducted using extruder Model 10DW (D: 19.1 mm, L/D: 10) (manufactured and sold by Brabender OHG, Germany) and a tube die (outer diameter: 9 mm, inner diameter: 8 mm) under conditions such that the screw temperature is 60° C., the head temperature is 100° C. and the revolution number of the screws is 50 rpm.

The texture of a tubular extrudate is evaluated by visual observation of the fineness of the texture, into 5 grades in the excellence order from 5 to 1.

The extrusion speed is calculated based on the length of the extrudate discharged per unit time.

The die swell is calculated based on the outer diameter and thickness of the tubular extrudate, using the following formulae:

Swell in outer diameter =

$$\frac{(\text{Outer diameter of tube}) - (\text{Outer diameter of die})}{(\text{Outer diameter of die})} \times 100(\%)$$

Swell in thickness =

$$\frac{(\text{Thickness of tube}) - (\text{Die clearance})}{(\text{Die clearance})} \times 100(\%)$$

Preferred Embodiment of the Invention

The present invention will be described in more detail with reference to the Examples, which should not be construed to be limiting the scope of the present invention.

Reference Example 1

The air in an autoclave having a capacity of about 15 liters which is provided with an electromagnetic stirrer is completely replaced by nitrogen gas, and an evacuation-$N_2$ filling cycle is repeated 3 times. After the nitrogen replacement, under reduced pressure, the autoclave is charged with 5440 g of degassed purified water, 1070 g of 1,1,2-trichloro-1,2,2-trifluoroethane (hereinafter referred to as "Freon-113") and 5.4 g of methylcellulose (viscosity 50 cps), followed by stirring at 600 rpm while maintaining the temperature at 50° C. Subsequently, a monomer mixture is charged as a charge gas, which consists of 14.7% by weight of VdF, 78.6% by weight of HFP and 6.7% by weight of TFE, until a pressure of 15 kg/cm$^2$.G is attained. Then, 26.5 g of a Freon-113 solution containing 20.1% by weight of diisopropyl peroxydicarbonate is introduced as a catalyst to thereby start the polymerization. As the polymerization proceeds, the pressure decreases to 14.5 kg/cm$^2$.G Then, a monomer mixture of 43.7% by weight of VdF, 29.6% by weight of HFP and 27.0% by weight of TFE is added as an additional gas, thereby to bring the pressure back to 15 kg/cm$^2$.G. By repeating this operation, the polymerization reaction is performed for 5 hours after the start of the polymerization. Then, 57 g of diiodomethane is added, and the polymerization reaction at a pressure of 14.5-15.0 kg/cm$^2$.G is continued for 11.7 hours (namely, the total period of polymerization is 16.7 hours). After completion of the polymerization reaction, the remaining monomer mixture is discharged. The obtained suspension is subjected to centrifugation to remove water. The resultant solid is thoroughly washed with water and then subjected to vacuum drying at 100° C. to obtain about 4.9 kg of the desired elastomer. An aliquot of the obtained fluorine-containing elastomer is subjected to $^{19}$F-NMR analysis to find that the elastomer is comprised of 43.9% by weight of VdF units, 30.6% by weight of HFP units and 25.5% by weight of TFE units.

With respect to the thus obtained fluorine-containing elastomer, the limiting viscosity number [$\eta$] is 97 ml/g, the molecular weight distribution chart exhibits a bimodal shape as shown in FIG. 1, the number average molecular weight ($\overline{Mn}$) is $2.8 \times 10^4$, and the $\overline{Mw}/\overline{Mn}$ ratio is 13.7. The iodine content of the elastomer is 10,400 ppm.

Examples 1 to 3 and Comparative Examples 1 to 4

The fluorine-containing elastomer obtained in Reference Example 1 and other compounding components in Table 1 are kneaded and vulcanized to obtain a vulcanization product. The mechanical properties of the obtained vulcanization products are measured, and the results are shown in Table 1. As apparent from the results, the compositions of the present invention are superior in mechanical properties to the compositions containing only one vulcanizing agent selected from polyols, polyamines and peroxides.

TABLE 1

| | | Composition of rubber (parts by weight) | | | | | | | | | |
|---|---|---|---|---|---|---|---|---|---|---|---|
| | Elastomer used | Elastomer | SRF[1] carbon | MT[2] carbon | Ca(OH)[3] | MgO(I)[4] | MgO(II)[5] | Bis-AF[6] | BDPIC[7] | TAIC[8] | PER.[9] HEXA 25B-40 | Diak #1,[10] #3[11] |
| Example 1 | Elastomer of Reference Example 1 | 100 | 15 | — | 6 | 3 | — | 2 | 0.375 | 2 | 1.88 | — |
| Example 2 | Elastomer of Reference Example 1 | 100 | — | 20 | — | — | 15 | — | — | 2 | 2 | #1 1.5 |

TABLE 1-continued

| | Elastomer | | | | | | | | | | | | |
|---|---|---|---|---|---|---|---|---|---|---|---|---|---|
| Example 3 | Elastomer of Reference Example 1 | 100 | — | 20 | — | — | 15 | — | — | 2 | 2 | #3 1.5 |
| Comparative Example 1 | Elastomer of Reference Example 1 | 100 | 15 | — | 6 | 3 | — | 2 | 1 | — | — | — |
| Comparative Example 2 | Elastomer of Reference Example 1 | 100 | 15 | — | — | — | — | — | — | 4 | 3.75 | — |
| Comparative Example 3 | Elastomer of Reference Example 1 | 100 | — | 20 | — | — | 15 | — | — | 2 | 2 | — |
| Comparative Example 4 | Elastomer of Reference Example 1 | 100 | — | 20 | — | — | 15 | — | — | — | — | #1 1.5 |

| | Elastomer used | Vulcanizing conditions | | Properties of vulcanization product (oven vulcanization product) | | | | | Amount of extract with methanol at 65° C. for 48 hr. (wt %) | Metal adhesion properties | Burr at molding |
|---|---|---|---|---|---|---|---|---|---|---|---|
| | | Press vulcanization | Oven vulcanization | Hardness JIS-A | 100% modulus | Tensile strength at break (kgf/cm²) | Tensile elongation at break (%) | Compression set (%) | | | |
| Example 1 | Elastomer of Reference Example 1 | 177° C. 20 min | 180° C. 4 hrs | 80 | 73 | 207 | 260 | — | 0.9 | ○ | Δ~○ |
| Example 2 | Elastomer of Reference Example 1 | 150° C. 30 min | 200° C. 24 hrs. | 81 | 125 | 156 | 105 | 28 | 0.37 | ○ | Δ~○ |
| Example 3 | Elastomer of Reference Example 1 | 150° C. 30 min | 200° C. 24 hrs | 77 | 85 | 165 | 145 | 46 | 0.31 | ○ | Δ~○ |
| Comparative Example 1 | Elastomer of Reference Example 1 | 177° C. 20 min | 180° C. 4 hrs | 78 | 34 | 130 | 400 | — | 2.9 | ○ | ○ |
| Comparative Example 2 | Elastomer of Reference Example 1 | 177° C. 20 min | 180° C. 4 hrs | Sheet formation is impossible | | | | | 0.1 | X | Δ |
| Comparative Example 3 | Elastomer of | 150° C. 30 min | 200° C. 24 hrs | 76 | 69 | 211 | 225 | 54 | 0.36 | X | X |

TABLE 1-continued

|  |  |  | | | | | | | | | |
|---|---|---|---|---|---|---|---|---|---|---|---|
| Comparative Example 4 | Elastomer of Reference Example 1 | 150° C. 30 min | 200° C. 24 hrs | 68 | 22 | 121 | 455 | 63 | 2.10 | ◯ | ◯ |

Note
[1]SRF carbon: "SEAST S" manufactured and sold by ASAHI CARBON, Japan
[2]MT carbon: "Thermax N-990" manufactured and sold by CANCARB Inc.
[3]Ca(OH): "CALVIT" manufactured and sold by OMI CHEMICAL INDUSTRY, Japan
[4]MgO(I): "KYOWAMAGU #150" manufactured and sold by KYOWA CHEMICAL INDUSTRY, Japan
[5]MgO(II): "KYOWAMAGU #30" manufactured and sold by KYOWA CHEMICAL INDUSTRY, Japan
[6]Bis-AF: Bisphenol AF
[7]BDPIC: Bis(benzyldiphenylphosphine)iminium chloride
[8]TAIC: Triaryl-iso-cyanurate
[9]"PERHEXA 25B-40": [2,5-dimethyl-2,5-di(t-butylperoxy)hexane] manufactured and sold by NIPPON OIL & FATS CO., LTD., Japan
[10]"Diak #1": (hexamethylenediamine carbamate) manufactured and sold by E. I. Du Pont De Nemours And Company, U.S.A.
[11]"Diak #3": (N,N'-dicinnamylidene-1,6-hexamethylene diamine) manufactured and sold by E. I. Du Pont De Nemours And Company, U.S.A.

Reference Example 2

The air in an autoclave having a capacity of about 15 liters which is provided with an electromagnetic stirrer is completely replaced by nitrogen gas, and an evacuation-$N_2$ filling cycle is repeated 3 times. After the nitrogen replacement, under reduced pressure, the autoclave is charged with 4760 g of degassed purified water, 2140 g of 1,1,2-trichloro-1,2,2-trifluoroethane (hereinafter referred to as "Freon-113"), 4.8 g of methylcellulose (viscosity 50 cps) as a suspension stabilizer and 25.0 g of diiodomethane, followed by stirring at 600 rpm while maintaining the temperature at 50° C. Then, a monomer mixture is charged as a charge gas, which consists of 24.7% by weight of VdF, 69.4% by weight of HFP and 5.9% by weight of TFE, until a pressure of 15 kg/cm$^2$.G is attained. Then, 20.8 g of a Freon-113 solution containing 20.5% by weight of diisopropyl peroxydicarbonate is introduced as a catalyst to thereby start the polymerization. As the polymerization proceeds, the pressure decreases to 14.5 kg/cm$^2$.G. Then, a monomer mixture of 53.0% by weight of VdF, 25.2% by weight of HFP and 21.8% by weight of TFE is added as an additional gas, to thereby bring the pressure back to 15 kg/cm$^2$.G By repeating this operation, the polymerization reaction is performed for 12.5 hours. After completion of the polymerization reaction, the remaining monomer mixture is discharged. The obtained suspension is subjected to centrifugation to remove water. The resultant solid is thoroughly washed with water and then subjected to vacuum drying at 100° C. to obtain about 4.4 kg of the desired fluorine-containing elastomer. An aliquot of the obtained fluorine-containing elastomer is subjected to $^{19}$F-NMR analysis to find that the elastomer is comprised of 49.7% by weight of VdF units, 30.8% by weight of HFP units and 19.5% by weight of TFE units. The fluorine content of the elastomer is 67.3% by weight.

With respect to the thus obtained fluorine-containing elastomer, the limiting viscosity number $[\eta]$ is 50 ml/g, the number average molecular weight ($\overline{Mn}$) is $3.5 \times 10^4$, the $\overline{Mw}/\overline{Mn}$ ratio is 2.2, and the iodine content of the elastomer is 3960 ppm.

Reference Example 3

The reactivities of iodine and bromine as vulcanization sites in the peroxide vulcanization reaction are compared. The properties of elastomers and vulcanization characteristics are shown in Table 2.

From Table 2, it is apparent that the elastomer containing iodine as a vulcanization site is superior to the elastomer containing bromine in respect of peroxide vulcanization reactivity, that is, vulcanization time and degree of vulcanization.

TABLE 2

| | Properties of elastomer | | | | Elastomer composition (parts by weight) | | | | | Vulcanization characteristics[2] | | | |
|---|---|---|---|---|---|---|---|---|---|---|---|---|---|
| | composition of elastomer VdF HFP TFE (wt %) | limiting viscosity number (ml/g) | Iodine content (ppm) | Bromine content (ppm) | elastomer | MT carbon black | lead oxide | PERHEXA 25B-40 | TAIC | minimum viscosity (kg/cm) | degree of vulcanization (kg/cm) | induction time (min) | optimum vulcanizing time (min) |
| Elastomer of Reference Example 2 | 49.7 30.8 19.5 | 50 | 3960 | — | 100 | 30 | — | 3.75 | 4 | 0.6 | 44.9 | 2.3 | 3.9 |
| Commercially[1] available fluoroelas- | 52.5 25.8 21.7 | 140 | — | 7200 | 100 | 30 | 3 | 3.75 | 4 | 4.8 | 33.3 | 2.8 | 16.2 |

TABLE 2-continued tomer

Note
[1] VITON VIX-5927 manufactured and sold by E. I. Du Pont De Nemours And Company, U.S.A.
[2] measured at 160° C. using a rheometer (Oscillating Disc Rheometer manufactured and sold by Toyo Seiki Seisakusho K.K., Japan). For the particulars of the vulcanization characteristics and measurement, reference is made to pages 213-225 of Gomu Shiken-ho (Rubber Testing Method) published by the Japanese Rubber Association in 1980.

Reference Example 4

The air in an autoclave having a capacity of about 50 liters which is provided with an electromagnetic stirrer is completely replaced by nitrogen gas, and an evacuation-$N_2$ filling cycle is repeated 3 times. After the nitrogen replacement, under reduced pressure, the autoclave is charged with 23.63 liters of degassed purified water, 2.96 liters of 1,1,2-trichloro-1,2,2-trifluoroethane (hereinafter preferred to as "Freon-113") and 23.6 g of methylcellulose (viscosity 50 cps) as a suspension stabilizer, followed by stirring at 480 rpm while maintaining the temperature at 50° C. Then, a monomer mixture is charged as a charge gas, which consists of 14.5% by weight of VdF, 79.1% by weight of HFP and 6.4% by weight of TFE, until a pressure of 15 kg/cm$^2$.G is attained. Then, 56.95 g of Freon-113 solution containing 20.1% by weight of diisopropyl peroxydicarbonate is introduced as a catalyst to thereby start the polymerization. As the polymerization proceeds, the pressure decreases to 14.5 kg/cm$^2$.G Then, a monomer mixture of 43.5% by weight of VdF, 29.5% by weight of HFP and 27.0% by weight of TFE is added as an additional gas, thereby to bring the pressure back to 15 kg/cm$^2$.G. By repeating this operation, the polymerization reaction is performed for 6.25 hours from the start of the polymerization. Then, 235 g of diiodomethane is added, followed by adding 56.95 g of Freon-113 solution containing 20.1% by weight of diisopropyl peroxydicarbonate. The polymerization reaction at 14.5-15.0 kg/cm$^2$.G is continued for 12.25 hours (namely, the total period of polymerization reaction is 18.5 hours). After completion of the polymerization reaction, the remaining monomer mixture is discharged. The obtained suspension is subjected to centrifugation to remove water. The resultant solid is thoroughly washed with water and then subjected to vacuum drying at 100° C. to obtain about 26.87 kg of the desired fluorine-containing elastomer. An aliquot of the obtained fluorine-containing elastomer is subjected to $^{19}$F-NMR analysis to find that the elastomer is comprised of 43.5% by weight of VdF units, 30.3% by weight of HFP units and 26.2% by weight of TFE units.

Figure 2:
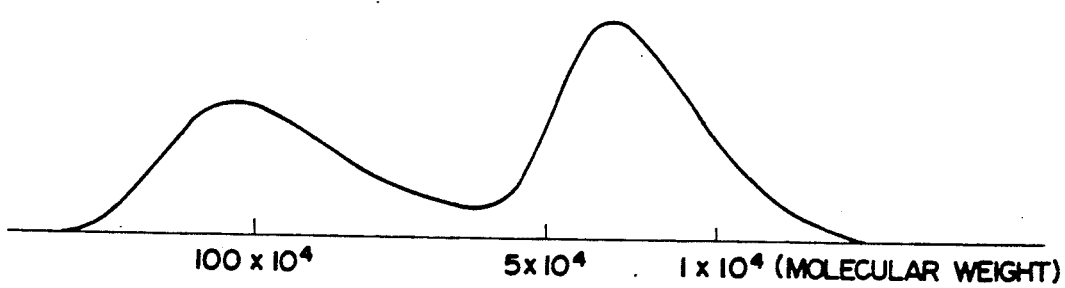

With respect to the thus obtained fluorine-containing elastomer, the limiting viscosity number [$\eta$] is 124 ml/g, the molecular weight distribution chart exhibits a bimodal shape as shown in FIG. 2, the number average molecular weight ($\overline{M}n$) is $2.9 \times 10^4$, the $\overline{M}w/\overline{M}n$ ratio is 17.2, $M_5$ is 49.9% by weight, $M_5/[\eta]$ is 0.40, the $\overline{M}w/\overline{M}n$ ratio of high molecular weight component is 2.1, $M_{200}$ is 6.8% by weight, and $M_1$ is 7.8% by weight.

Reference Examples 5 through 15

Polymerization is conducted under the same conditions as described in Reference Example 4, except those indicated in Table 3. The properties of obtained elastomers are indicated in Table 4.

Examples 4 through 13 and Comparative Examples 5 through 7

Each of the elastomers obtained in Reference Examples 4 through 15 is blended with compounding components by means of rolls to obtain an elastomer composition. The extrusion speed and extrudate texture are measured. A vulcanized sheet is prepared in the same manner as described above, which is subjected to a tensile test. The roll processability of unvulcanized elastomer composition is also evaluated. Further, the amount of methanol extract is measured with respect to a vulcanization product. The results are indicated in Table 4. In Comparative Example 6, commercially available fluorine-containing elastomer Daiel-G555 is used, which is suited for extrusion processing. With respect to this as well, the evaluation results are shown in Table 4.

In Examples 4 through 13 and Comparative Examples 5 through 7 the following composition recipe and vulcanizing conditions are employed.

| Recipe | |
|---|---|
| Fluorine-containing elastomer | 100 parts by weight |
| SRF carbon[1] | 12 parts by weight |
| Cu(OH)$_2$[3] | 6 parts by weight |
| MgO(I)[4] | 3 parts by weight |
| Bis A-F[6] | 2 parts by weight |
| BDPIC[7] | 0.5 parts by weight |
| TAIC[8] | 0.5 parts by weight |
| PERHEXA25B40[9] | 0.5 parts by weight |
| Conditions | |
| press vulcanization | at 155° C. for 70 min. |
| oven vulcanization | at 180° C. for 3 hrs. |

Provided that, with respect to the commercially available fluorine-containing elastomer, the following composition recipe and vulcanizing conditions are employed.

| Recipe | |
|---|---|
| Fluorine-containing elastomer | 100 parts by weight |
| SRF carbon[1] | 15 parts by weight |
| Cu(OH)$_2$[3] | 6 parts by weight |
| MgO(I)[4] | 3 parts by weight |
| Conditions | |
| press vulcanization | at 155° C. for 70 min. |
| oven vulcanization | at 180° C. for 3 hrs. |

Note
[1] "SEAST S" manufactured and sold by Tokai Carbon, Japan
[3] "CALVIT" manufactured and sold by Omi Chemical Industry, Japan
[4] "KYOWAMAGU-#150" sold by Kyowa Chemical Industry, Japan
[6] Bisphenol AF
[7] Bis(benzyldiphenylphosphine)iminium chloride
[8] Triarylisocyanurate
[9] "PERHEXA25B40" [2,5-dimethyl-2,5-di(t-butylperoxy)-hexane] manufactured and sold by Nippon Oil & Fats Co., Ltd., Japan In all of the Examples, the results are superior to those of the Comparative Examples.

In Examples 4 to 9 and 11 to 13, the roll processability is excellent, with the extrusion speed, extrudate texture and tensile strength and break well balanced. In Example 10, the die swell is advantageously small and the extrusion speed, extrudate texture, tensile strength at break and tensile elongation at break are excellent.

In Comparative Examples 5 to 7, the tackiness to rolls is large, thereby rendering rolling operation difficult.

Further, in Comparative Example 5, the tensile strength at break is disadvantageously low. In Comparative Example 7, a disadvantageously large die swell occurs.

TABLE 3

|  | Autoclave capacity (liter) | Rate of stirring (rpm) | Polymerization pressure (kg/cm²) | Amount of charged purified water (g) | Amount of charged flon (liter) | Amount of charged methylcellulose (g) | Composition of starting monomer mixture VDF/HFP/TFE (wt %) |
|---|---|---|---|---|---|---|---|
| Reference Example 4 | 50 | 480 | 15-14.5 | 23.63 | 2.96 | 23.6 | 14.5/79.1/6.4 |
| Reference Example 5 | 50 | 480 | 15-14.5 | 23.63 | 2.96 | 23.6 | 14.6/79.1/6.3 |
| Reference Example 6 | 50 | 480 | 15-14.5 | 23.63 | 2.96 | 23.6 | 14.6/79.1/6.3 |
| Reference Example 7 | 50 | 480 | 15-14.5 | 23.63 | 2.96 | 23.6 | 14.6/79.1/6.3 |
| Reference Example 8 | 50 | 480 | 8-7.5 | 23.63 | 4.65 | 23.6 | 18.2/74.1/7.7 |
| Reference Example 9 | 15 | 600 | 15-14.5 | 4.76 | 2.14 | 4.8 | 24.2/69.8/6.0 |
| Reference Example 10 | 15 | 600 | 15-14.5 | 5.44 | 1.07 | 5.4 | 14.6/79.1/6.3 |
| Reference Example 11 | 50 | 480 | 15-14.5 | 23.63 | 2.96 | 23.6 | 14.6/79.1/6.3 |
| Reference Example 12 | 15 | 600 | 15-14.5 | 5.44 | 0.68 | 5.4 | 12.3/83.0/4.7 |
| Reference Example 13 | 15 | 600 | 15-14.5 | 5.44 | 0.68 | 5.4 | 14.5/79.2/6.3 |
| Reference Example 14 | 15 | 600 | 15-14.5 | 5.44 | 0.68 | 5.4 | 14.5/79.8/6.3 |
| Reference Example 15 | 15 | 600 | 15-14.5 | 5.44 | 0.68 | 5.4 | 14.7/79.1/6.4 |

|  | Composition of additional monomer mixture VDF/HFP/TFE (wt %) | Amount of initiator (g) Initial | Amount of initiator (g) additional | Amount of diiodomethane (g) | Time for adding diiodomethane | Total polymerization time (hr) | Weight of elastomer (kg) |
|---|---|---|---|---|---|---|---|
| Reference Example 4 | 43.5/29.5/27.0 | 56.95 | 56.95 | 235 | 6.25 hrs later | 18.5 | 26.87 |
| Reference Example 5 | 43.5/29.5/27.0 | 56.95 | 56.95 | 329 | 6.3 hrs later | 24.5 | 26.2 |
| Reference Example 6 | 43.5/29.5/27.0 | 69.50 | 46.34 | 238 | 5.7 hrs later | 16.3 | 24.3 |
| Reference Example 7 | 43.5/29.5/27.0 | 86.90 | 144.8 | 342 | 6.0 hrs later | 13.0 | 32.8 |
| Reference Example 8 | 44.1/29.3/26.6 | 740.0 | 0 | none | none | 6.4 | 19.0 |
| Reference Example 9 | 53.0/25.3/21.7 | 10.60 | 10.60 | 17.5 | 4.0 hrs later | 5.3 | 0.8 |
| Reference Example 10 | 43.5/29.5/27.0 | 53.20 | 0 | 113 | 5.0 hrs later | 13.0 | 5.7 |
| Reference Example 11 | 43.5/29.5/27.0 | 50.0 | 0 | 43 | 5.0 hrs later | 12.0 | 2.8 |
| Reference Example 12 | 43.5/29.5/27.0 | 6.75 | 20.2 | 33.5 | 6.8 hrs later | 14.5 | 3.1 |
| Reference Example 13 | 43.5/29.5/27.0 | 26.95 | 0 | 32.8 | 5.5 hrs later | 12.3 | 5.2 |
| Reference Example 14 | 43.5/29.5/27.0 | 26.95 | 0 | 32.2 | 5.2 hrs later | 10.3 | 4.2 |
| Reference Example 15 | 43.5/29.5/27.0 | 3.8 | 23.2 | 56.8 | 11.5 hrs later | 23.7 | 5.9 |

Note
1): Amount of initiator indicatd above is the weight of a Freon-113 solution of 20.1% by weight of diisopropyl peroxydicarbonate.
2): The initiator is introduced initially at the start of polymerization, and the addition thereof is made right after the addition of diiodomethane.

TABLE 4

| Elastomer used | Composition of elastomer VDF/HFP/TFE (wt %) | $[\eta]$ (ml/g) | $\overline{Mn}$ (*$10^4$) | $\overline{Mw}/\overline{Mn}$ | M5 wt % | M5/$[\eta]$ | $\overline{Mw}/\overline{Mn}$ of elastomer | M1 wt % | $M_{200}$ wt % | Morphology of molecular weight distribution |
|---|---|---|---|---|---|---|---|---|---|---|

TABLE 4-continued

| | Elastomer used | | | | | | | | | | |
|---|---|---|---|---|---|---|---|---|---|---|---|
| Example 4 | Elastomer of Reference Example 4 | 43.5/30.3/26.2 | 124 | 2.9 | 17.2 | 49.9 | 0.40 | 2.1 | 7.8 | 6.8 | 2 peaks |
| Example 5 | Elastomer of Reference Example 5 | 43.7/29.3/27.0 | 118 | 2.2 | 21.1 | 56.1 | 0.48 | 2.2 | 11.4 | 7.1 | 2 peaks |
| Example 6 | Elastomer of Reference Example 6 | 43.7/29.3/27.0 | 157 | 2.9 | 18.9 | 46.4 | 0.30 | 2.3 | 8.0 | 7.8 | 2 peaks |
| Example 7 | Elastomer of Reference Example 7 | 43.7/29.3/27.0 | 154 | 3.2 | 20.1 | 42.7 | 0.28 | 2.3 | 7.3 | 7.8 | 2 peaks |
| Example 8 | Elastomer of Reference Example 9 | 52.0/25.5/22.5 | 138 | 2.9 | 15.5 | 26.6 | 0.19 | 2.5 | 15.8 | 3.7 | 3 peaks |
| Example 9 | Elastomer of Reference Example 10 | 43.0/29.5/27.5 | 103 | 2.4 | 14.8 | 29.7 | 0.29 | 2.5 | 16.9 | 1.3 | 2 peaks |
| Example 10 | Elastomer of Reference Example 11 | 43.7/29.3/27.0 | 83 | 2.4 | 15.0 | 45.8 | 0.55 | 2.5 | 12.3 | 1.3 | 3 peaks |
| Example 11 | Elastomer of Reference Example 12 | 43.7/29.3/27.0 | 111 | 2.6 | 17.0 | 56.0 | 0.51 | 2.4 | 8.6 | 7.8 | 2 peaks |
| Example 12 | Elastomer of Reference Example 13 | 43.5/31.9/24.6 | 105 | 4.3 | 11.3 | 34.6 | 0.33 | 2.3 | 4.2 | 5.2 | 2 peaks |
| Example 13 | Elastomer of Reference Example 14 | 43.5/31.9/24.6 | 113 | 3.6 | 9.7 | 32.5 | 0.29 | 2.4 | 5.8 | 4.0 | 2 peaks |
| Comparative Example 5 | Elastomer of Reference Example 8 | 44.1/29.2/26.7 | 65 | 5.4 | 2.6 | 27.1 | 0.42 | 2.6 | 2.0 | 0 | 1 peak |
| Comparative Example 6 | see note | 44.1/29.3/26.6 | 81 | 2.3 | 22.7 | 49.1 | 0.61 | 3.5 | 13.0 | 6.1 | 2 peaks |
| Comparative Example 7 | Elastomer of Reference Example 15 | 44.1/29.2/26.7 | 156 | 3.1 | 25.8 | 55.7 | 0.36 | 2.5 | 8.6 | 13.8 | 2 peaks |

| | Elastomer used | Presence of iodine | Extrusion speed (cm/min) | Extrudate texture (point) | Die swell (inner diameter/thickness) | Tensile strength at break (kg/cm$^2$) | Tensile elongation at break (%) | 100% modulus (kg/cm$^2$) | Hardness JIC-A | Roll processability | Amount of methanol extract (wt %) |
|---|---|---|---|---|---|---|---|---|---|---|---|
| Example 4 | Elastomer of Reference Example 4 | yes | 123 | 4.5 | 31/17 | 138 | 366 | 26 | 74 | good | 2.6 |
| Example 5 | Elastomer of Reference Example 5 | yes | 162 | 4.5 | 33/18 | 123 | 380 | 25 | 74 | good | 2.7 |
| Example 6 | Elastomer of Reference Example 6 | yes | 124 | 4.5 | 27/7 | 143 | 387 | 31 | 73 | good | 2.5 |
| Example 7 | Elastomer of Reference Example 7 | yes | 117 | 4.5 | 29/9 | 147 | 382 | 55 | 73 | good | 2.3 |
| Example 8 | Elastomer of Reference Example 9 | yes | 51 | 1-2 | 28/12 | 130 | 320 | 35 | 72 | good | 6.5 |
| Example 9 | Elastomer of Reference Example 10 | yes | 91 | 2 | 23/4 | 115 | 415 | 23 | 71 | good | 5.7 |
| Example 10 | Elastomer of | yes | 136 | 4 | 15/8 | 129 | 427 | 21 | 78 | poor | 3.5 |

TABLE 4-continued

|  |  |  |  |  |  |  |  |  |  |  |
|---|---|---|---|---|---|---|---|---|---|---|
| Example 11 | Elastomer of Reference Example 11 | yes | 124 | 4.5 | 35/20 | 136 | 415 | 22 | 70 | good | 2.3 |
| Example 12 | Elastomer of Reference Example 12 | yes | 74 | 4.5 | 29/12 | 183 | 340 | 30 | 74 | good | 1.4 |
| Example 13 | Elastomer of Reference Example 13 | yes | 60 | 3.5 | 30/14 | 170 | 350 | 32 | 74 | good | 1.8 |
| Comparative Example 5 | Elastomer of Reference Example 14 | no | 101 | 3 | 29/24 | 115 | 330 | 34 | 72 | poor | 0.6 |
| Comparative Example 6 | see note | yes | 145 | 4 | 39/42 | 138 | 300 | 28 | 73 | poor | 3.2 |
| Comparative Example 7 | Elastomer of Reference Example 15 | yes | 125 | 4.5 | 40/44 | 130 | 500 | 23 | 72 | poor | 2.7 |

Note: Daiel G-555 manufactured and sold by Daikin Industry Co., Ltd., Japan

Reference Example 16

The air in an autoclave having a capacity of about 50 liters which is provided with an electromagnetic stirrer is completely replaced by nitrogen gas, and an evacuation-$N_2$ filling cycle is repeated 3 times. After the nitrogen replacement, under reduced pressure, the autoclave is charged with 23.63 kg of degassed purified water, 2.96 liters of 1,1,2-trichloro-1,2,2-trifluoroethane (hereinafter referred to as "Freon-113") and 23.6 g of methylcellulose (viscosity 50 cps) as a suspension stabilizer, followed by stirring at 476 rpm while maintaining the temperature at 50° C. A monomer mixture of 14.6% by weight of VdF, 79.1% by weight of HFP and 6.3% by weight of TFE is charged therein as a charge gas until the pressure reaches 15 kg/cm².

Then, 0.2 g of diiodomethane is added, and further 115.6 g of a Freon-113 solution containing 20.1% by weight of diisopropyl peroxydicarbonate as a catalyst is added, to thereby start a polymerization. When the pressure decreases to 14.5 kg/cm².G due to the polymerization, an additional monomer mixture of 43.7% by weight of VdF, 29.3% by weight of HFP and 27.0% by weight of TFE is added to thereby bring the pressure back to 15 kg/cm².G. By repeating this operation, the polymerization reaction is carried out for 2.9 hours after the start of the polymerization. Then, 61.0 g of diiodomethane is added, and the polymerization reaction is further continued under a pressure of 14.5 to 15.0 kg/cm².G for 4.9 hours (namely, the total period of polymerization reaction is 7.8 hours). After completion of the polymerization reaction, the remaining monomer mixture is discarded. The obtained suspension is dehydrated by a centrifugal separator, and thoroughly washed with water, followed by vacuum drying at 100° C. to thereby obtain approximately 9.8 kg of elastomer. The thus obtained fluorine-containing elastomer is analyzed by $^{19}$F-NMR. The elastomer is found to be comprised of 43.9% by weight of VdF units, 29.9% by weight of HFP units and 26.2% by weight of TFE units.

Figure 3:
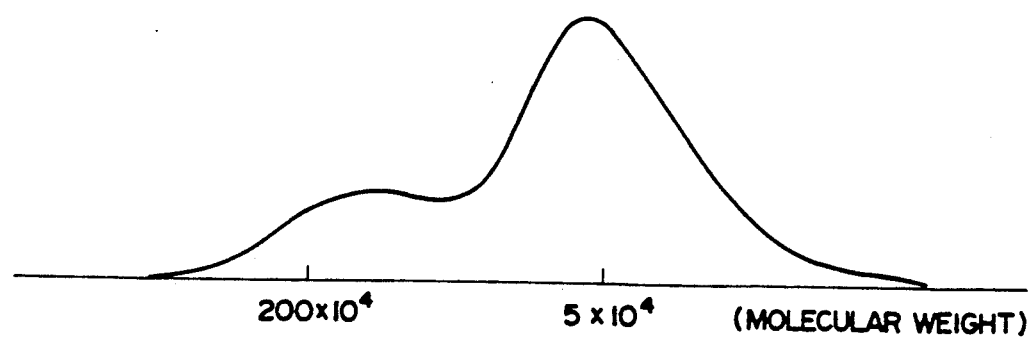

With respect to this fluorine-containing elastomer, [$\eta$] is 78 ml/g, the molecular weight distribution chart exhibits a bimodal shape as shown in FIG. 3, $\overline{M}n$ is $3.6 \times 10^4$, $\overline{M}w/\overline{M}n$ is 6.2, M5 is 38.9% by weight and $M_5/[\eta]$ is 49.9.

Reference Examples 17 through 22

Polymerization is conducted under the same conditions as in Reference Example 16, except those indicated in Table 5. The properties of the obtained elastomers are indicated in Table 6.

Examples 14 through 19 and Comparative Examples 8 and 9

Each of the elastomers obtained in Reference Examples 16 through 22 is individually blended with compounding agents by means of rolls to obtain an elastomer composition. The extrusion speed and extrudate texture are measured. The roll processability of the composition in unvulcanized form is evaluated. A vulcanized sheet is prepared in the same manner as described above, which is subjected to measurement of the amount of methanol extract and a tensile test. The results of these measurements and tests are indicated in Table 7. In Comparative Example 9, use is made of commercially available fluorine-containing elastomer (Fluorel as defined hereinbefore) suited for extrusion processing. The same evaluations as above are made for this elastomer as well. The results are indicated in Tables 6 and 7.

In Examples 14 through 19 and Comparative Examples 8 and 9, the same composition recipe and vulcanizing conditions as in Examples 4 through 13 and Comparative Examples 5 through 7 are employed.

In all of the Examples, the results are superior to those of the Comparative Examples.

In Examples 14 through 19, the roll processability is excellent, with the extrusion speed, extrudate texture and tensile strength at break well balanced.

In Comparative Examples 8 and 9, the tackiness to rolls is large, thereby rendering rolling operation difficult.

Further, in comparative Example 8, the tensile strength at break is poor, and in Comparative Example 9, the extrusion speed is disadvantageously low and the extrudate texture is poor.

TABLE 5

| | Autoclave capacity (liter) | Rate of stirring (rpm) | polymerization pressure (kg/cm²) | Amount of charged purified water (g) | Amount of charged flon (liter) | Amount of charged methylcellulose (g) | Composition of starting monomer mixture VDF/HFP/TFE (wt %) | Composition of additional monomer mixture VDF/HFP/TFE (wt %) |
|---|---|---|---|---|---|---|---|---|
| Reference Example 16 | 50 | 480 | 15-14.5 | 23.63 | 2.96 | 23.6 | 14.6/79.1/6.3 | 43.7/29.3/27.0 |
| Reference Example 17 | 50 | 480 | 15-14.5 | 23.63 | 2.96 | 23.6 | 14.6/79.1/6.3 | 43.7/29.3/27.0 |
| Reference Example 18 | 15 | 600 | 15-14.5 | 5.44 | 0.68 | 5.4 | 14.6/79.1/6.3 | 43.7/29.3/27.0 |
| Reference Example 19 | 50 | 480 | 15-14.5 | 23.63 | 2.96 | 23.6 | 14.6/79.1/6.3 | 43.7/29.3/27.0 |
| Reference Example 20 | 15 | 600 | 15-14.5 | 5.44 | 0.68 | 5.4 | 14.6/79.1/6.3 | 43.7/29.3/27.0 |
| Reference Example 21 | 15 | 600 | 15-14.5 | 5.44 | 0.68 | 5.4 | 14.6/79.1/6.3 | 43.7/29.3/27.0 |
| Reference Example 22 | 15 | 600 | 15-14.5 | 5.44 | 0.68 | 5.4 | 14.6/79.1/6.3 | 43.7/29.3/27.0 |

| | Amount of initiator (g) | Amount of diodomethane added initial | Amount of diodomethane added additional | Timing for additing diiodomethane initial | Timing for additing diiodomethane additional | Total polymerization time (hr) | Weight of elastomer (Kg) |
|---|---|---|---|---|---|---|---|
| Reference Example 16 | 23.12 | 0.2 | 61.0 | start | 2.9 hrs later | 7.8 | 9.8 |
| Reference Example 17 | 23.12 | 0.5 | 70.0 | start | 3.3 hrs later | 8.2 | 16.5 |
| Reference Example 18 | 2.67 | 0 | 13.3 | start | 6.5 hrs later | 17.8 | 3.7 |
| Reference Example 19 | 23.12 | 126.3 | 0 | start | no addition | 19.5 | 29.7 |
| Reference Example 20 | 5.39 | 0 | 22.7 | none | 4.2 hrs later | 11.3 | 4.1 |
| Reference Example 21 | 5.39 | 0 | 10.0 | none | 6.8 hrs later | 6.8 | 3.2 |
| Reference Example 22 | 5.39 | 0.5 | 6.1 | start | 3.5 hrs later | 6.8 | 2.7 |

Note: Initiator is added as 20% by weight solution in Freon-113.

TABLE 6

| | Elastomer used | Composition of elastomer VDF/HFP/TFE (wt %) | $[\eta]$ (ml/g) | $\overline{M_n}$ (*10⁴) | $\overline{M_w}/\overline{M_n}$ | M5 wt % | M5/$[\eta]$ | Morphology molecular weight distribution | Presence of iodine |
|---|---|---|---|---|---|---|---|---|---|
| Example 14 | Elastomer of Reference Example 16 | 43.9/29.9/26.2 | 78 | 3.6 | 6.3 | 38.9 | 0.50 | 2 peaks | yes |
| Example 15 | Elastomer of Reference Example 17 | 43.1/30.6/26.2 | 80 | 5.0 | 5.0 | 28.3 | 0.35 | 2 peaks | yes |
| Example 16 | Elastomer of Reference Example 18 | 42.7/30.6/26.7 | 118 | 5.8 | 7.8 | 25.9 | 0.22 | 2 peaks | yes |
| Example 17 | Elastomer of Reference Example 20 | 43.5/30.4/26.1 | 78 | 3.8 | 6.3 | 35.4 | 0.46 | 2 peaks | yes |
| Example 18 | Elastomer of Reference Example 21 | 43.7/30.5/25.8 | 116 | 6.1 | 6.3 | 22.8 | 0.20 | 2 peaks | yes |
| Example 19 | Elastomer of Reference Example 22 | 43.4/30.3/26.3 | 125 | 7.3 | 6.0 | 18.3 | 0.14 | 2 peaks | yes |
| Comparative Example 8 | Elastomer of Reference Example 19 | 43.3/29.7/27.0 | 53 | 4.3 | 2.2 | 30.0 | 0.57 | 1 peak | yes |
| Comparative | see note | 45.2/29.6/25.2 | 65 | 5.3 | 4.6 | 23.2 | 0.36 | 1 peak | no |

TABLE 6-continued

| | Elastomer used | Composition of elastomer VDF/HFP/TFE (wt %) | [η] (ml/g) | $\overline{Mn}$ (*10^4) | $\overline{Mw}/\overline{Mn}$ | M5 wt % | M5/[η] | Morphology molecular weight distribution | Presence of iodine |
|---|---|---|---|---|---|---|---|---|---|
| Example 9 | | | | | | | | | |

Note: Fluorel sold by Sumitomo 3M Sales, Japan

TABLE 7

| | Elastomer used | Extrusion speed (cm/min) | Extrudate texture (point) | Tensile strength at break (kg/cm²) | Tensile elongation at break (%) | 100% modulus (kg/cm²) | Hardness JIC-A | Roll processability |
|---|---|---|---|---|---|---|---|---|
| Example 14 | Elastomer of Reference Example 16 | 92 | 4 | 135 | 358 | 33 | 78 | good |
| Example 15 | Elastomer of Reference Example 17 | 75 | 4 | 145 | 347 | 35 | 78 | good |
| Example 16 | Elastomer of Reference Example 18 | 70 | 4 | 149 | 301 | 40 | 78 | good |
| Example 17 | Elastomer of Reference Example 20 | 65 | 3.5 | 162 | 280 | 53 | 79 | good |
| Example 18 | Elastomer of Reference Example 21 | 42 | 3.5 | 170 | 300 | 38 | 81 | good |
| Example 19 | Elastomer of Reference Example 22 | 30 | 3 | 150 | 300 | 40 | 80 | good |
| Comparative Example 8 | Elastomer of Reference Example 19 | 140 | 2 | 110 | 360 | 42 | 81 | poor |
| Comparative Example 9 | see note | 50 | 2 | 169 | 277 | 54 | 87 | poor |

Note: Fluorel sold by Sumitomo 3M Sales, Japan

What is claimed is:

1. A fluorine-containing elastomer composition comprising:

(A) a fluorine-containing elastomer comprising (a) vinylidene fluoride units, (b) hexafluoropropylene units and 35 to 0% by weight, based on the total weight of units (a), (b) and (c), of (c) tetrafluoroethylene units, the weight ratio of (a) to (b) being in the range of 40:60 to 80:20, wherein:
the limiting viscosity number (ml/g) of the elastomer is in the range of from 40 to 200,
the ratio of the weight average molecular weight to the number average molecular weight of the elastomer is in the range of from 3 to 25,
the elastomer has a multimodal molecular weight distribution such that in the molecular weight distribution curve obtained by gel permeation chromatography, the elastomer exhibits a plurality of peaks comprised of one peak on the low molecular weight side, which peak is defined as a peak appearing in the lowest molecular weight region among the plurality of peaks and at least one peak on the high molecular weight side, which peak is defined as a peak appearing on the higher side of molecular weight relative to said lowest molecular weight region, and
the elastomer has iodine bonded thereto;

(B) at least one vulcanizing agent selected from the group consisting of a polyol vulcanizing agent, a polyamine vulcanizing agent and a mixture thereof, said polyol vulcanizing agent comprising a polyhydroxy aromatic compound, at least one salt selected from the group consisting of an ammonium salt, a phosphonium salt and an iminium salt and at least one metal compound selected from the group consisting of a bivalent metal oxide for said polyol vulcanizing agent and a bivalent metal hydroxide, and
said polyamine vulcanizing agent comprising a polyamine compound and a bivalent metal oxide for said polyamine vulcanizing agent;

(C) an organic peroxide; and (D) a polyfunctional unsaturated compound.

2. The fluorine-containing elastomer composition according to claim 1, wherein:
the limiting viscosity number (ml/g) of the elastomer is in the range of from 100 to 170,
the ratio of the content of fractions having a molecular weight of not greater than 50,000 to the limiting viscosity number (ml/g) of the elastomer is in the range of from 0.25 to 0.60,
the ratio of the weight average molecular weight to the number average molecular weight of the elastomer is in the range of from 10 to 25, the content of fractions having a molecular weight of not greater than 10,000 in the elastomer is less than 15% by weight, and with respect to fractions corresponding to said at least one peak on the high molecular weight side in the molecular weight distribution curve, the ratio of the weight average molecular weight to the number average molecular weight is in the range of from 1.2 to 3.0.

3. The fluorine-containing elastomer composition according to claim 1, wherein:

the limiting viscosity number (ml/g) of the elastomer is in the range of from 60 to 130, the ratio of the content of fractions having a molecular weight of not greater than 50,000 to the limiting viscosity number (ml/g) of the elastomer is in the range of from 0.15 to 0.60, and the ratio of the weight average molecular weight to the number average molecular weight of the elastomer is in the range of from 4 to less than 8.

4. The fluorine-containing elastomer composition according to any one of claims 1 to 3, wherein the vulcanizing agent comprises said polyol vulcanizing agent.

5. The fluorine-containing elastomer composition according to claim 4, wherein the polyol vulcanizing agent comprises 0.1 to 10 parts by weight, per 100 parts by weight of the elastomer, of the polyhydroxy aromatic compound, 0.05 to 2 parts by weight, per 100 parts by weight of the elastomer, of said at least one salt and 1 to 30 parts by weight, per 100 parts by weight of the elastomer, of said at least one metal compound.

6. The fluorine-containing elastomer composition according to any one of claims 1 to 3, wherein the vulcanizing agent comprises said polyamine vulcanizing agent.

7. The fluorine-containing elastomer composition according to claim 6, wherein the polyamine vulcanizing agent comprises 0.1 to 10 parts by weight, per 100 parts by weight of the elastomer, of the polyamine compound and 1 to 30 parts by weight, per 100 parts by weight of the elastomer, of the bivalent metal oxide.

8. The fluorine-containing elastomer composition according to any one of claims 1 to 3, wherein the vulcanizing agent comprises said polyol vulcanizing agent and said polyamine vulcanizing agent.

9. The fluorine-containing elastomer composition according to claim 8, wherein the polyol vulcanizing agent comprises 0.1 to 5 parts by weight, per 100 parts by weight of the elastomer, of the polyhydroxy aromatic compound, 0.05 to 2 parts by weight, per 100 parts by weight of the elastomer, of said at least one salt and 1 to 20 parts by weight, per 100 parts by weight of the elastomer, of said at least one metal compound for said polyol vulcanizing agent, and the polyamine vulcanizing agent comprises 0.1 to 5 parts by weight, per 100 parts by weight of the elastomer, of the polyamine compound 1 to 20 parts by weight, per 100 parts by weight of the elastomer, of the bivalent metal oxide for said polyamine vulcanizing agent.

10. The fluorine-containing elastomer composition according to any one of claim 1 to 3, wherein the amount of the organic peroxide compound present is from 0.05 to 10 parts by weight per 100 parts by weight of the elastomer.

11. The fluorine-containing elastomer composition according to any one of claims 1 to 3, wherein the amount of the polyfunctional unsaturated compound present is from 0.01 to 10 parts by weight per 100 parts by weight of the elastomer.

12. The fluorine-containing elastomer composition according to any one of claims 1 to 3, wherein the amount of the iodine present is from 0.01 to 5% by weight, based on the total weight of units (a), (b) and (c) and the iodine.

13. The fluorine-containing elastomer composition according to claim 2, wherein said fractions corresponding to said at least one peak on the high molecular weight side in the molecular weight distribution curve, have a molecular weight of 50,000 or more.

* * * * *